United States Patent [19]

Dorman

[11] Patent Number: 4,668,184
[45] Date of Patent: May 26, 1987

[54] ANNULAR SHAFT KILN

[75] Inventor: William D. Dorman, Schnecksville, Pa.

[73] Assignee: Fuller Company, Bethlehem, Pa.

[21] Appl. No.: 883,407

[22] Filed: Jul. 8, 1986

[51] Int. Cl.[4] ............................................. F27D 1/08
[52] U.S. Cl. ........................................ 432/99; 432/96
[58] Field of Search ................................ 432/95–101, 432/13

[56] References Cited

U.S. PATENT DOCUMENTS

| | | | |
|---|---|---|---|
| 2,518,490 | 8/1950 | Parry | 432/95 |
| 3,958,919 | 5/1976 | Kjell-Berger | 432/99 |
| 4,140,480 | 2/1979 | Kaiser et al. | 432/96 |
| 4,289,481 | 9/1981 | Yano | 432/96 |
| 4,351,119 | 9/1982 | Mennier | 432/98 |
| 4,403,951 | 9/1983 | Beckenbach et al. | 432/96 |
| 4,431,407 | 2/1984 | Beckenbach et al. | 432/99 |
| 4,452,584 | 6/1984 | Beckenbach et al. | 432/99 |
| 4,473,352 | 9/1984 | Sonoda et al. | 432/96 |

Primary Examiner—Henry C. Yuen
Attorney, Agent, or Firm—Frank H. Thomson

[57] ABSTRACT

An improved annular shaft kiln for burning particulate material such as limestone which adds a bridge to the lower part of the annular material zone between the burning zone and the cooling zone. This bridge permits heated cooling gas and at least some of the spent cooling gas to be withdrawn from the annular zone and be supplied directly to the combustion chamber of the kiln.

4 Claims, 2 Drawing Figures

ANNULAR SHAFT KILN

BACKGROUND OF INVENTION

This invention relates to an improved annular shaft kiln for calcining solid particulate material such as limestone and in particular to a modification to the recycled gas arrangement of an annular shaft kiln. Specifically, the present invention provides a simplified arrangement for utilizing the cooling gas stream in the calcining system of a shaft kiln.

The invention is specifically directed to shaft kiln of the type disclosed in U.S. Pat. Nos. 4,025,293; 3,695,595; 3,294,936; and 4,254,221. It is to be understood however that the concepts of the present invention are equally applicable to the other types of shaft kilns.

Shaft kilns for burning or calcining solid particulate material such as limestone normally include a generally vertical hollow structure having an upper inlet for material to be burned and a lower outlet for calcined or burned material. In annular shaft kilns, an inner cylinder is positioned within the vertical structure and an annular zone is defined between the vertical structure and the inner cylinder. The top portion of the annular zone serves as a material preheater, the center section serves as a burning or calcining zone and the lower zone serves as a cooling zone. The burning zone is divided into two regions. Gases in the upper region of the burning zone flow upward, countercurrent to the flow of particulate material. Gases in the lower part of the burning zone flow downward, cocurrent with the material. The downwardly flowing spent calcining gases are recycled back to the burning zone. One or more burner chambers are defined within the annular zone, one in the upper region and one in the lower region. A draft may be drawn on the upper part of the structure so that cooling air is induced into the bottom of the structure to flow upwardly to the annular zone and cool calcined material in the lower part of the annular zone. The contact of the cooling air with the hot material results in heating of the cooling air. With prior practice, the hot spent cooling gas and recycled spent calcining gas is conducted through the inner cylinder then to an injector and from the injector to a combustion or burner chamber in the annular zone. The injectors utilize preheated combustion air under pressure to induce the flow of spent cooling air and recycled gas to enhance the draft on the vessel to draw recycled calcining gas and heated spent cooling gas to the lower burner chamber. Spent combustion air from the upper burner chamber serves to preheat solid particulate material to be burned in the upper part of the annular zone.

With the system of prior devices, and in particular with the utilization of the inner cylinder as a means for supplying preheated combustion gas to the burning chamber, there is a requirement for a complicated double wall construction of the inner cylinder since the inner cylinder is exposed to heat on both its inside and its outside. This means that the inside as well as the outside of the cylinder must be refractory lined. Further, with prior designs, the construction of the arches in the annular zone defining the burning chambers must be unduly complex in order to permit hot spent cooling gas to be withdrawn from the inner cylinder. Further, the remoteness of the hot spent cooling air from the burner injectors results in heat loss by radiation which increases fuel consumption and hence operating costs.

SUMMARY

It is therefore the principle object of this invention to provide an improved annular shaft kiln for burning solid particulate material which provides a simplified structure with lower equipment costs and lower fuel consumption compared with prior practice.

In general the foregoing and other objects will be carried out by providing in an annular shaft kiln for calcining solid particulate material such as limestone including a generally vertical hollow structure having an inlet at its upper end for material to be calcined and an outlet at its lower end for calcined material, an inner cylinder positioned within said vertical structure to define with said vertical structure an annular zone between the inlet and the outlet, means defining at least one first chamber in the annular zone for introducing hot gases into said zone for calcining solid particulate material therein and means for supplying cooling gas to said annular zone for cooling the calcined material whereby the cooling gas is heated, the improvement comprising means defining at least one second chamber in said annular zone for removing from the annular zone cooling gas which has been heated by calcined material and at least some of the hot spent calcining gas; said means defining a second chamber being positioned between said chamber for introducing hot gas and said means for supplying cooling gas; and means external to said structure flow connecting said means defining a second chamber to said means defining a first chamber for supplying the thus heated cooling gas to said first chamber.

BRIEF DESCRIPTION OF THE DRAWINGS

The invention shall be described in connection with the annexed drawings wherein.

DESCRIPTION OF THE PREFERRED EMBODIMENT

Figures 1, 2:
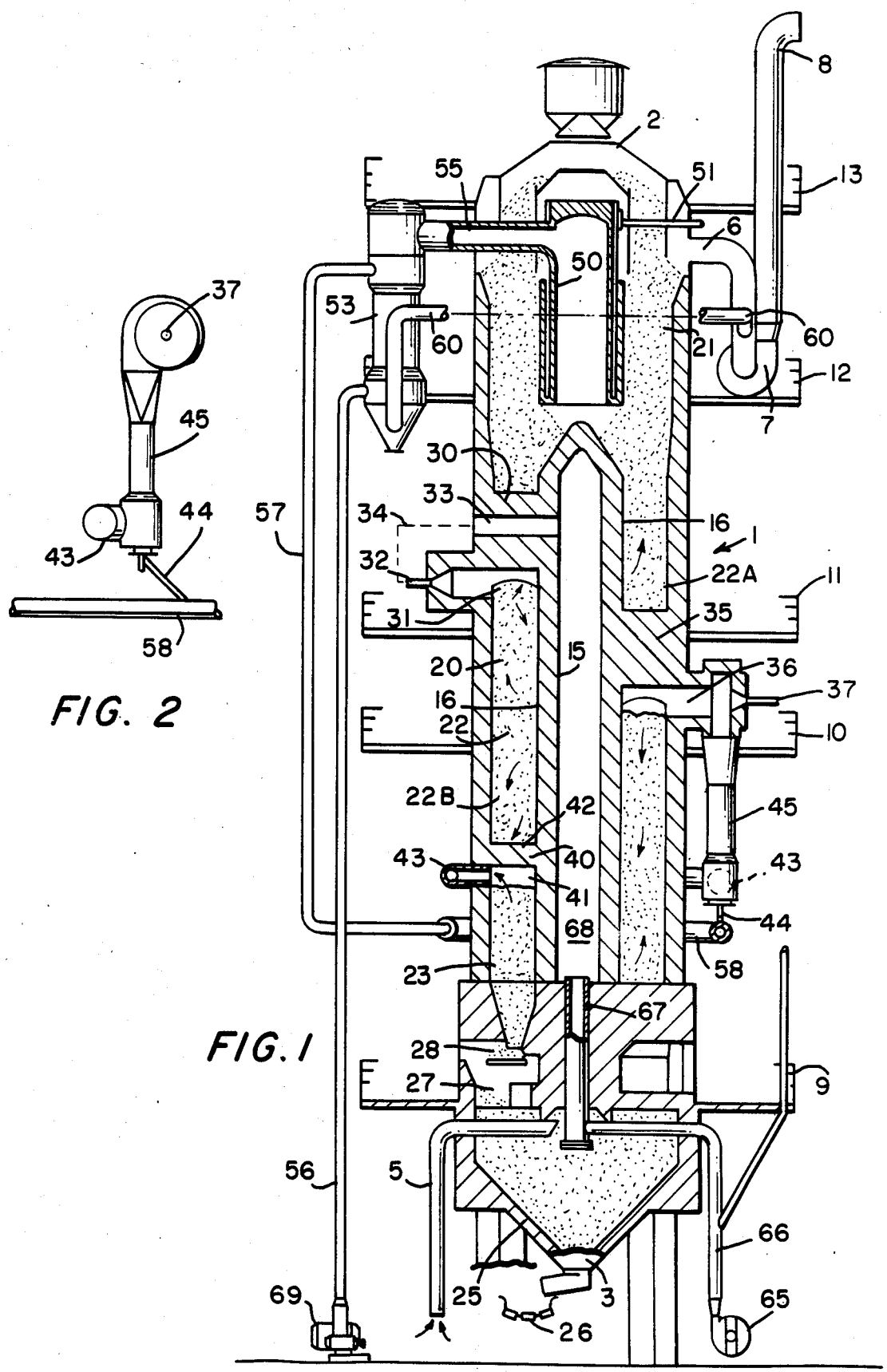
FIG. 1 is a sectional view of an annular shaft kiln according to the present invention.
FIG. 2 is a view of the injector according to the present invention.

The invention is best illustrated in FIG. 1 and includes a generally vertical hollow structure generally indicated at 1 having an inlet 2 for solid particulate material such as limestone to be calcined and an outlet 3 at its lower end for cooled calcined material. The lower end of the structure 1 also includes a means 5 for supplying cooling air to the structure 1 for cooling material. In the form illustrated, this means 5 is a conduit for induced ambient air. The structure also includes in its upper end an outlet 6 for spent gas connected to a fan 7 and stack 8 which may be connected to a suitable high efficiency dust collector (not shown). Walkways 9, 10, 11, 12 and 13 are provided around the structure to serve as access platforms to the various elements of the kiln.

An inner cylinder 15 is positioned within the structure 1 and lined on its outside 16 with refractory material. The inner cylinder 15 together with the structure 1 defines an annular zone 20 therebetween. The upper part 21 of the zone 20 serves as a material preheater, the central part 22 of the zone 20 serves as a burning or calcining zone and the lower part 23 of the zone 20 serves as a cooling zone. The calcining zone 22 includes an upper part or region 22A which serves as a countercurrent burning region wherein hot calcining gas flows countercurrent to the flow of particulate material and a lower part or region 22B which serves as a cocurrent burning region wherein hot calcining gas flows in the same direction or cocurrent to the material flow. The lowest part of the structure 1 forms a hopper at 25 which discharges material onto a conveyor 26 for conveying the burned material to a storage or use point.

The means for inducing cooling air to the bottom of the structure 1 includes not only the conduit 5 but also the fan 7 which draws a negative pressure on the entire annular zone 20. Cooling air or ambient air is drawn into the hopper 25 through conduit 5 and up through the annular area 27 into the cooling zone 23 through inlets 28. This cooling air makes direct heat exchange contact with calcined material in the cooling zone 23 which results in hot material being cooled and the cooling gas being heated.

The structure 1 includes an upper arch 30 which defines therebelow a chamber 31 which serves as a burner chamber. While only a single burner chamber 31 and arch 30 are illustrated, it should be understood that there may be a plurality of circumferentially spaced apart arches 30 joining the inner cylinder 15 with the structure 1 to define several chambers 31, each having a burner means 32 operatively associated therewith.

A second arch 35 is positioned between the vertical structure 1 and the inner cylinder 15 to define another burner chamber 36 having a burner means 37 operatively associated therewith. As is the case with respect to arch 30 and chamber 31, there may be a plurality of circumferentially spaced apart arches 35 defining a plurality of chambers 36. The burner chambers 31 and 36 may be referred to as first chambers in the annular zone 20. Combustion takes place in the burner chambers 31 and 36 so that hot gas is supplied to the annular burning zone 22 burning material therein. The upper burner chamber 31 supplies hot calcining gases to the upper part 22A of the burning zone countercurrent to material flow and the lower burner chamber 36 supplies hot calcining gases to the lower part 22B of the burning zone cocurrent to material flow. The upper arch 30 includes a conduit 33 connecting the inside of the inner cylinder 15 through a duct 34 with the burner 32 to provide heated secondary air for combustion as will be explained hereafter.

The annular zone 20 also includes a third arch or bridge means 40 in the lower part thereof extending between cylinder 15 and the structure 1 to serve as means defining a second chamber 41 therebelow. The bridge means 40 includes a plurality of circumferentially spaced apart spoke members 42 so that there are a plurality of circumferentially spaced apart second chambers 41.

The upper part of the structure 1 also includes a second internal cylinder 50 which may be of double walled construction having means 51 for supplying cooling gas to the inside thereof. This cylinder 50 is hollow and receives spent calcining gas from the upper burning region 22A and supplies the same to a recuperator 53 through duct 55.

In operation, particulate material such as limestone to be burned or calcined is supplied to the upper material inlet 2 for passage by gravity through the annular zone 20 to the lower material outlet 3. The fan 7 places the zone 20 under negative pressure and induces ambient air to flow through conduit 5 into hopper 25, through opening 28 into the cooling zone 23. The ambient air is heated by hot calcined material in the cooling zone 23 and flows upward through cooling zone 23 to chamber 41 countercurrent to the downward flow of material. From chamber 41 the heated spent cooling gas passes through conduit 43 to an injector 45. The injector serves to supply this preheated secondary air for combustion to the burning chamber 36 where it combines with the burner 37 to supply hot burning gases to the annular zone 20.

A portion of the combustion air from chamber 36 flows concurrent with material flow downward in the region 22B toward the chamber 41 to burn or calcine material in the burning zone 22. This hot spent calcining gas is withdrawn from the chambers 41 in the same manner as the spent cooling gas and supplied as recycled gas to the injector 45 and combustion chamber 36 for supplying hot spent cooling gas and at least some of the hot spent calcining gas to the first chamber 36.

The duct 43 and injector 45 serve as a means external of the structure 1 flow connecting the second chamber 41 to the first chamber 36.

Since burning or calcining material such as limestone will require the maintenance of temperatures on the order of 1800° F. in the burning zone 22, a considerable amount of heat will be transferred to the inner cylinder 15. A fan 65 is connected by means of ducts 66 and 67 to the inside 68 of the cylinder 15 to serve as a means for supplying cooling gas to the inner cylinder 15. Due to the heat transfer from the burning zone, the thus supplied ambient air is heated and may be utilized in the burning process for fuel conservation. This thus heated air is supplied from space 68 through ducts 33 and 34 to burning zone 31 to serve as secondary air for combustion in the upper burner chamber 31.

Combustion in chamber 31 supplies hot gases to the upper burning region 22A so that this gas combined with a portion of the combustion gas from the lower burner chamber 36 to produce two stage burning of the material to calcine the material therein.

Hot spent burning gas from the zone 22A then flows upwardly through the bed of material countercurrent to material flow to the upper zone 21 to preheat raw material being supplied to the apparatus. Some of the hot gas enters the upper inner cylinder 50 and some of the hot gas preheats the raw material and is thereafter discharged through outlet 6 to fan 7 and stack 8. The gas which is supplied to the inner cylinder 50 is conveyed through duct 55 to the recuperator 53. Ambient air is supplied from a blower 69 and duct 56 to the recuperator 53 where it is heated by indirect heat exchanger with hot gas from cylinder 50 and supplied by duct 57 and annular manifold 58 to the injector 45 to serve as driving air to induce the flow of hot spent cooling air and hot spent recycled calcining gas from chamber 41 to the first chamber 36. The hot gas from duct 55 is supplied by conduit 60 to the fan 7 and stack 8 after indirect heat exchange with the fresh air in recuperator 53.

With prior apparatus, heated cooling gas and recycled calcining gas is supplied to the inner cylinder 15. These gases are then withdrawn from the inner cylinder 15 and supplied to the burning chamber. With such a design, hot gases are on both sides of the inner cylinder necessitating a refractory lining on both sides and a complicated interior cooling structure. Since hot gas is removed through a top arch, this arch must have a complex structure. While arches are similar to those illustrated at 40 were used in early annular shaft kilns, in those instances the hot gases were supplied to the inner cylinder rather than being supplied to the injector 45 by external ducting as with the present invention. With the present invention ambient air is supplied to the inner cylinder so that the cylinder is cooled.

Based upon the foregoing, the simplified structure of the present invention should be seen. The inner cylinder 15 can be simplified in construction in that the double walled construction of the prior art is no longer required. Refractory on the inside 68 of the inner cylinder 15 can be eliminated because the inside is cooled by ambient air. The arches 30 and 35 above the burners can be simplified by eliminating the cooling/recycled gas ducts above the upper burners and eliminating at least one set of cooling air ducts above the lower burners. The burner arches will now more easily accommodate coal lances through the top of the arches. With the present invention, the refractory on the outer side of the cylinder 15 can be better insulated to thereby reduce heat loss through the annular space. This will result in a more efficient unit utilizing less fuel than with prior practice.

With the present invention, cooling air required for the annulus 15 can be much lower than with the past practice. This will reduce excess combustion air rate, fuel consumption and power consumption for the unit as a whole.

It is intended that the foregoing be a description of a preferred embodiment and that the invention be limited solely by that which is within the scope of the appended claims.

I claim:

1. In an annular shaft kiln or calcining solid particulate material such as limestone including a generally vertical hollow structure having an inlet at its upper end for material to be calcined and an outlet at its lower end for calcined material, an inner cylinder positioned within said vertical structure to define with the vertical structure an annular zone between the inlet and the outlet, means defining at least one first chamber in the annular zone for introducing hot calcining gases into said zone for calcining solid particulate material therein and means for supplying cooling gas to said annular zone for cooling the calcined material whereby the cooling gas is heated, the improvement comprising means defining at least one second chamber in said annular zone for removing from the annular zone cooling gas which has been heated by calcined material and at least some of the hot spent calcining gases; said means defining a second chamber being positioned between said means defining at least one first chamber and said means for supplying cooling gas; and means external to said structure flow connecting said means defining a second chamber to said means defining a first chamber for supplying the thus heated cooling gas and spent hot calcining gas to said first chamber, said means defining a second chamber including a bridge means extending between said inner cylinder and said vertical structure.

2. In an annular shaft kiln according to claim 1 wherein said bridge means includes a plurality of circumferentially spaced apart spoke members.

3. In an annular shaft kiln according to claim 2 the improvement further comprising said inner cylinder having substantially solid walls, an inlet for gas for cooling the inside thereof and an outlet for gas.

4. In an annular shaft kiln according to claim 3 wherein the improvement further comprises means for supplying cooling air to the inside of said inner cylinder and means for supplying spent cylinder cooling air to said first chamber.

* * * * *